United States Patent
Hill et al.

(10) Patent No.: US 9,631,972 B2
(45) Date of Patent: Apr. 25, 2017

(54) DISTRIBUTED FIBRE OPTIC SENSING

(75) Inventors: David John Hill, Dorchester (GB); Magnus McEwen-King, Farnborough (GB)

(73) Assignee: Optasense Holdings Limited (GB)

( * ) Notice: Subject to any disclaimer, the term of this patent is extended or adjusted under 35 U.S.C. 154(b) by 1077 days.

(21) Appl. No.: 13/509,407

(22) PCT Filed: Nov. 11, 2010

(86) PCT No.: PCT/GB2010/002073
§ 371 (c)(1),
(2), (4) Date: May 11, 2012

(87) PCT Pub. No.: WO2011/058313
PCT Pub. Date: May 19, 2011

(65) Prior Publication Data
US 2012/0226452 A1 Sep. 6, 2012

(30) Foreign Application Priority Data
Nov. 13, 2009 (GB) .................................. 0919904.3

(51) Int. Cl.
*G01F 17/00* (2006.01)
*G01B 3/00* (2006.01)
(Continued)

(52) U.S. Cl.
CPC ............ *G01H 9/004* (2013.01); *G01S 3/8083* (2013.01); *G01S 5/22* (2013.01)

(58) Field of Classification Search
CPC ........ G01S 17/026; G08B 13/184; G01H 9/00
(Continued)

(56) References Cited

U.S. PATENT DOCUMENTS

| 4,654,520 A | 3/1987 | Griffiths |
| 5,194,847 A | 3/1993 | Taylor et al. |

(Continued)

FOREIGN PATENT DOCUMENTS

| CN | 101539631 | 9/2009 |
| GB | 2442745 | 4/2008 |
| WO | WO 2008/081157 | 7/2008 |

OTHER PUBLICATIONS

Unpublished U.S. Appl. No. 13/509,425, filed May 11, 2012 entitled: Optic Fibres and Fibre Optic Sensing.
(Continued)

*Primary Examiner* — An Do
(74) *Attorney, Agent, or Firm* — McDonnell Boehnen Hulbert & Berghoff LLP

(57) ABSTRACT

Techniques for determining lateral offset of the source of an acoustic disturbance in a distributed acoustic fiber optic sensor are described. The sensor comprises an optical source (112) for interrogating an optical fiber (104) and a detector (116) and processor (108) arranged to detect any backscattered radiation and determine a measurement signal for a plurality of discrete longitudinal sensing portions of the optical fiber. The processor is also arranged to analyse the measurement signals to identify signals corresponding to the same acoustic wave arriving at different parts of the fiber and determine from the time of arrival of said acoustic wave the direction and/or distance of the origin of said acoustic wave from the optical fiber. The geometry of the fiber may be arranged to ensure that any positional ambiguity can be resolved and the use of multiple fibers (501, 502) is disclosed.

11 Claims, 3 Drawing Sheets

(51) Int. Cl.
*G01H 9/00* (2006.01)
*G01S 3/808* (2006.01)
*G01S 5/22* (2006.01)

(58) Field of Classification Search
USPC .................................................. 702/56, 33
See application file for complete search history.

(56) References Cited

U.S. PATENT DOCUMENTS

| | | |
|---|---|---|
| 6,601,671 B1 | 8/2003 | Zhao et al. |
| 2004/0246816 A1 | 12/2004 | Ogle |
| 2006/0028636 A1* | 2/2006 | Payton .................. 356/73.1 |
| 2006/0122780 A1* | 6/2006 | Cohen et al. ............... 702/14 |
| 2006/0126435 A1 | 6/2006 | Tam et al. |
| 2010/0117830 A1 | 5/2010 | Strong et al. |
| 2010/0200743 A1 | 8/2010 | Forster et al. |

OTHER PUBLICATIONS

Preliminary Amendment filed on May 11, 2012 in U.S. Appl. No. 13/509,425.
Unpublished U.S. Appl. No. 13/509,415, filed May 11, 2012 entitled: Fibre Optic Distributed Sensing.
Preliminary Amendment filed on May 11, 2012 in U.S. Appl. No. 13/509,415.
Unpublished U.S. Appl. No. 13/509,402, filed May 11, 2012 entitled: Improvements in Distributed Fibre Optic Sensing.
Preliminary Amendment filed on May 11, 2012 in U.S. Appl. No. 13/509,402.

\* cited by examiner

DISTRIBUTED FIBRE OPTIC SENSING

FIELD OF THE INVENTION

This invention relates to distributed acoustic fibre optic sensing and to methods and apparatus for determining the lateral offset of the origin of an incident acoustic wave on a distributed acoustic sensor.

BACKGROUND OF THE INVENTION

Various sensors utilizing optical fibres are known. Many such sensors rely on fibre optic point sensors or discrete reflection sites such as fibre Bragg gratings or the like being arranged along the length of an optical fibre. The returns from the discrete point sensors or reflection sites can be analysed to provide an indication of the temperature, strain and/or vibration in the vicinity of the discrete sensors or reflection sites.

Such sensors using discrete reflection sites or fibre optic point sensors require the optical fibre including the sensor portions to be specially fabricated. Further the distribution of the sensors within the optical fibre is fixed.

Fully distributed fibre optic sensors are also known in which the intrinsic scattering from a continuous length of optical fibre is used. Such sensors allow use of standard fibre optic cable without deliberately introduced reflection sites such fibre Bragg gratings or the like. The entire optical fibre from which a backscatter signal can be detected can be used as part of the sensor. Time division techniques are typically used to divide the signal returns into a number of time bins, with the returns in each time bin corresponding to a different portion of the optical fibre. Such fibre optic sensors are referred to as distributed fibre optic sensors as the sensor options are fully distributed throughout the entire optical fibre. As used in this specification the term distributed fibre optic sensor will be taken to mean a sensor in which the optical fibre itself constitutes the sensor and which does not rely on the presence of specific point sensors or deliberately introduced reflection or interference sites, that is an intrinsic fibre optic sensor.

Various types of distributed fibre optic sensor are known and have been proposed for use in various applications.

U.S. Pat. No. 5,194,847 describes a distributed acoustic fibre optic sensor for intrusion sensing. A continuous optical fibre without any point sensors or specific reflection sites is used. Coherent light is launched into the optical fibre and any light which is Rayleigh backscattered within the optical fibre is detected and analysed. A change in the backscattered light in a time bin is indicative of an acoustic or pressure wave incident on the relevant portion of optical fibre. In this way acoustic disturbances any portion of the fibre can be detected.

GB patent application publication No. 2,442,745 describes a distributed acoustic fibre optic sensor system wherein acoustic vibrations are sensed by launching a plurality of groups of pulse modulated electromagnetic waves into a standard optical fibre. The frequency of one pulse within a group differs from the frequency of another pulse in the group. The Rayleigh backscattering of light from intrinsic reflection sites within the fibre is sampled and demodulated at the frequency difference between the pulses in a group.

Distributed fibre optic sensing or distributed acoustic sensing (DAS) therefore provides useful and convenient sensing solutions that can monitor long lengths of optical fibre with good spatial resolution. For instance a distributed fibre optic acoustic sensor, for instance as may be used for monitoring a pipeline, can be implement with sensing portions 10 m long in up 40 km or more of optical fibre.

Each sensing portion can detect any incident acoustic disturbances and such sensor have been proposed for use in intrusion detection systems, condition monitoring systems, seismic surveying and operational monitoring, i.e. monitoring the operation of some apparatus. However a distributed acoustic sensor such as described in GB 2,442,745 basically indicates whether there is an acoustic disturbance at a particular section of the sensing fibre. This provides an indication of where along the fibre an acoustic event has occurred but it gives no information as to the point of origin of the acoustic disturbance in relation to the fibre, i.e. there is no information regarding the lateral offset of the origin of the acoustic disturbance from the fibre—how far away from the fibre and/or in which direction.

SUMMARY OF THE INVENTION

It is therefore an object of the present invention to provide distributed acoustic fibre optic sensors which provide information about the lateral offset from the sensing fibre of the source of an acoustic wave.

Thus according to a first aspect of the present invention there is provided a distributed acoustic sensor comprising a first optical fibre; a source of electromagnetic radiation configured to launch electromagnetic radiation into said first optical fibre; a detector for detecting electromagnetic radiation back-scattered from said first optical fibre; and a processor configured to: process the back-scattered radiation to determine a measurement signal for a plurality of discrete longitudinal sensing portions of the first optical fibre; analyse the measurement signal from said longitudinal sensing portions to identify signals corresponding to the same acoustic wave arriving at a first plurality of longitudinal sensing portions and determine from the time of arrival of said acoustic wave at the longitudinal sensing portions of said first plurality the direction and/or distance of the origin of said acoustic wave from the optical fibre.

The method of the present invention thus provides a distributed acoustic sensor such as one described in GB 2,442,745. The distributed acoustic sensor launches optical radiation into an optical fibre and detects the radiation back-scattered from said fibre and processes the back-scattered radiation to provide a plurality of longitudinal sensing portions. The sensor of the present invention then analyses the signals from the sensing portions to identify any signals corresponding to the same acoustic wave incident at different sensing portions. If an acoustic wave does effect more than one longitudinal sensing portion of the fibre the time of arrival of the wave at the different sensing portions of the fibre may be used to determine the direction and/or distance, i.e. the lateral offset of the source of the acoustic wave from the optical fibre.

As used herein the term acoustic wave shall be taken to include any pressure or seismic wave and shall include any propagating mechanical or vibrational disturbance.

The present invention therefore uses time of arrival techniques to determine the direction and/or distance to the origin of an acoustic wave. If an acoustic event occurs at a particular location, i.e. an event which generates an acoustic wave, the acoustic wave will propagate outwards in all directions subject to normal pressure or acoustic wave mechanics. The wave may be incident on various longitudinal sensing portions of the fibre and cause a disturbance of the fibre which can be detected. As different parts of the sensing fibre will be located at different location from the location of the acoustic event the time take for the acoustic wave to reach different portions of the sensing fibre will vary. The difference in time of arrival of the acoustic wave can be used to determine the distance of the location of the acoustic event, i.e. the origin of the acoustic wave, from the optical fibre.

In essence, assuming that the propagation speed of the acoustic wave does not vary between the origin and each of the sensing portions of the fibre, the difference in time of arrival can be used to determine, in terms of time, how far away the origin of the acoustic wave is from the optical fibre. Using a value for the propagation speed of an acoustic wave the time be converted into a distance. The different times of arrival may be turned into differences in range to origin before determining the overall range to the origin or the calculation may be performed in terms of time and then translated into a distance.

The propagation speed for the acoustic wave could be a standard estimated value or it may have been determined previously through test or calibration.

In order to determine the lateral offset the processor preferably uses the time of arrival of the acoustic wave at three or more different longitudinal sensing portions which may, for example, be three adjacent longitudinal sensing portions.

The processor may be arranged to assume that the origin of the acoustic wave is in a particular plane. For instance, if the distributed acoustic sensor has a buried fibre for perimeter monitoring say it may be assumed that all the acoustic sources of interest are on the surface of the ground. If the fibre is not buried very deep in the ground the acoustic source may therefore be assumed to be in a plane horizontal to the fibre without significant error.

If the signals used in the analysis come from longitudinal sensing portions of the fibre which are co-linear there will be an ambiguity in the actual location of the acoustic wave, i.e. the distance of the origin of the acoustic wave may be known but the direction may not be known. Even in the case where the source is assumed to lie in one plane there may be ambiguity as to which side of the fibre the source of the acoustic wave is located.

Therefore the processor preferably uses the time of arrival of the acoustic wave at a plurality of longitudinal sensing portions which are not co-linear. By using three or more sensing portions of fibre which are not co-linear, i.e. which could not be approximated by point sensors which all lie on a straight line, the positional ambiguity of the source of the acoustic wave may be removed.

In one embodiment therefore the optical fibre has a geometry such that at east some longitudinal sensing portions of fibre are offset from their neighbouring longitudinal sensing portions of optical fibre. For example every ten or so longitudinal sensing portions of fibre may comprise at least one longitudinal sensing portion which is offset, i.e. not co-linear with the others.

In one embodiment the optical fibre may have a meandering path such that each longitudinal sensing portion is offset from at least one of its neighbouring longitudinal sensing portions.

It should be noted that the use of a geometry where the longitudinal portions are offset from one another in a transverse direction allows the direction of the origin of the source of the acoustic wave to be determined even without determining the actual distance to the origin. For instance imagine the fibre meanders such that any two longitudinal sensing portions of fibre are separated by one longitudinal sensing portion which is offset from the other two in a transverse direction). In effect this situation the fibre can be approximated by a first row of sensors having along a first path and a second interspersed row of sensors along a second path, which is offset from the first path in a transverse direction. If an acoustic wave is incident from either side the sensors on the path on the relevant side will detect it first. Thus a very simple detection algorithm can be used to determine which side an acoustic source is located on. If the source were located between the first and second paths the time delay between arrival at the sensors of the first and second paths would be low and thus this situation would be detectable. The present invention therefore may provide a relatively simple arrangement for detecting on which side of the sensor the source of the acoustic wave is.

The sensor may comprise at least a second optical fibre running alongside the first optical fibre but spaced apart in a first direction. The second optical fibre may be interrogated in the same way as the first optical fibre. The processor may be adapted to detect measurement signals in longitudinal sensing portions of the first and second optical fibres that correspond to the same acoustic wave and determine the direction of the source of acoustic wave based on the time of arrival at the first and second fibres.

The processor may further be adapted to use signals from longitudinal sensing portions of both the first and second optical fibres in determining the lateral offset.

In one embodiment there may be a third optical fibre running alongside the first and second optical fibres but spaced apart therefrom in a second direction, substantially perpendicular to the first direction. The processor may use signals from all three sensing fibres to determine the location of the acoustic wave in three dimensions.

Whilst separate fibres are a convenient way of achieving multiple longitudinal sensing portions running alongside one another the same effect may be achieved by looping a single fibre back upon itself, possibly many times.

The use of multiple fibres represents another aspect of the present invention. Thus according to another aspect of the invention there is provided a distributed acoustic sensor comprising a first length of optical fibre and a second length of optical fibre running alongside the first length of optical fibre but separated therefrom in a first direction; a source of electromagnetic radiation configured to launch electromagnetic radiation into said first length optical fibre and said second length of optical fibre; a detector apparatus for detecting electromagnetic radiation back-scattered from said first length of optical fibre and said length of optical fibre; and a processor configured to: process data corresponding to the detected back-scattered radiation to determine a measurement signal for each a plurality of discrete longitudinal sensing portions of each the first length of optical fibre and the second length of optical fibre; analyse the measurement signal from said longitudinal sensing portions to identify signals corresponding to the same acoustic wave arriving at one or more longitudinal sensing portions of the first length of optical fibre and one or more longitudinal sensing portions of the second length of optical fibre and determine from the time of arrival of said acoustic wave at said longitudinal sensing portions the direction and/or distance of the origin of said acoustic wave from the optical fibre.

The first and second lengths of optical fibre may comprise separate optical fibres or they may comprise different parts of the same optical fibre.

The processor may simply determine the direction of the acoustic wave in the first direction, i.e. on which side of the two lengths of optical fibre is the origin of the acoustic wave, based on which length of optical fibre detects the wave first. Additionally or alternatively the processor may be arranged to use the time of arrival of the acoustic wave at a plurality of longitudinal sensing portions of the first and/or second lengths of optical fibre to determine the distance to the origin.

In one embodiment there sensor may comprise a third length of optical fibre running alongside the first and second lengths of optical fibre and offset therefrom in a second direction, wherein the second direction is perpendicular to the first direction. The processor may use the returns from all three lengths of optical fibre to determine the location of the origin of the acoustic wave in three dimensions.

The distance to the source of the acoustic disturbance may also be determined by considering the frequency characteristics of the detected acoustic signals. This may be in addition to, or instead of, an analysis of the time of arrival of the acoustic disturbance at different sensing portions of the fibre.

Acoustic signals are attenuated when propagating through material and the attenuation is typically frequency dependent. For acoustic signals propagating through the ground, for instance to a buried fibre, the high frequency components of the signal are generally attenuated more strongly than the low frequency components. Thus the frequency characteristics of the received signal may be used to determine the range to the acoustic source. Therefore, in another aspect of the invention there is provided a distributed acoustic sensor comprising an optical fibre; a source of electromagnetic radiation configured to launch electromagnetic radiation into said first optical fibre; a detector for detecting electromagnetic radiation back-scattered from said first optical fibre; and a processor configured to: process data corresponding to the detected back-scattered radiation to determine a measurement signal for a plurality of discrete longitudinal sensing portions of said optical fibre wherein said processor is adapted to performing frequency analysis on the measurement signals to determine the location of an acoustic source.

The indication of range may be relative, i.e. it may simply indicate whether the source of one acoustic disturbance is closer or further away than the source of another acoustic disturbance. For instance if one received signal has a significant high frequency component and another received signal has no significant high frequency component then the signal received with a high frequency component may be assumed to closer than that with no high signal component.

Clearly the nature of the acoustic event which generates the acoustic wave is important as an acoustic event which generates a predominantly low frequency acoustic signal may not have significant high frequency components anyway. Also the relative magnitude of the initial acoustic wave will have an impact, a larger disturbance from further away may lead to a larger high frequency component that a relatively smaller disturbance occurring nearby the sensor. However processing detected signals from a continuing disturbance, i.e. comparing a received signal at one time with that received from the same disturbance at a later time, may allow a detection of whether the origin of the disturbance is moving and if so whether it is getting closer or further away. A steadily increasing high frequency component of the detected acoustic disturbance may indicate that the source of the disturbance is moving closer to that section of the fibre.

Further many acoustic sources produce a relatively wideband initial acoustic wave with high and low frequency components and the relative ratio of low and high frequency components may be analysed. Thus an acoustic signal which has a large magnitude low frequency component and a low magnitude high frequency component may represent a relatively distant signal as the high frequency component has been significantly attenuated compared to the low frequency component. However a signal with relatively equal magnitudes of low and high frequency components may represent a relatively close signal as both high and low frequency components are present without significant attenuation.

Further the frequency response from measurement signals from other parts of the fibre may be used to provide a degree of calibration. For example imagine that an acoustic disturbance is detected at a first sensing portion of the fibre at a first time and later at a second, different sensing of the fibre at a second time. Time of arrival analysis to determine a general range or difference in range may be conducted as discussed above. Additionally or alternatively however the frequency characteristics of the signals detected at the two different sensing portions may be analysed to determine the relative attenuation of the high and low frequency parts of the signal. This may be used to determine the relative amounts of attenuation and hence give an indication of the range to the acoustic source.

In some embodiments acoustic signature analysis may be applied to the detected signals in order to detect specific acoustic events. Certain types of activity produce a particular type of acoustic signal with a particular evolution over time. Signal analysis may be used to detect events of a certain type in which case the expected spectral characteristics of the original acoustic wave may be known, i.e. the relative ratio of low and high frequency components. In such cases the relative ratio of components of the detected signals in various frequency bands may be used to give an indication of range, which may be an estimation of actual range rather than simply a relative measure.

In relatively simple implementations however, especially where the majority of acoustic events of interest are of the same general type, i.e. of a similar magnitude and spectrum, analysis of the frequency of the components may be used directly to give a estimate of range. For example, in a particular, relatively high frequency band the presence of significant components in the measurement signal may indicate that the acoustic source is within certain distance, say 5 m for example, whereas the absence of such components will mean that the source is further away.

It is also possible to detect a DC component in the measurement signals. Such a DC component is typically due to the action of a relatively close disturbance and thus a measurement of DC can also be used to determine an indication of range as discussed above.

In another embodiment there is provided a distributed acoustic sensor comprising a distributed acoustic sensor comprising an optical fibre; a source of electromagnetic radiation configured to launch electromagnetic radiation into said optical fibre; a detector apparatus for detecting electromagnetic radiation back-scattered from said optical fibre; and a processor configured to: process data corresponding to the detected back-scattered radiation to determine a measurement signal for a plurality of discrete longitudinal sensing portions of said optical fibre wherein said processor is adapted to performing beamforming on the measurement signals to determine the location of an acoustic source.

As the skilled person will appreciate beamforming is a technique which combines the signal returns with appropriate phase shifts and weightings to provide directionality. In this way the relevant sensing portions of the sensor may be used a directional acoustic sensor. The directionality can be varied by changing the phase shifts and weightings applied to the signal returns such that the sensor can effectively be scanned in various directions. Thus the direction to an acoustic source can be found by determining the direction which gives a large response. Distance may be determine by also determining the direction to the source using a different collection of sensing elements and triangulating.

The present invention also relates to a method of determining the lateral offset of an acoustic wave detected by a distributed acoustic sensor. Thus in another aspect of the invention there is provided a method determining lateral offset of an acoustic event in distributed acoustic sensing comprising the steps of: taking data corresponding to detected electromagnetic radiation which has been back-scattered from an optical fibre; processing said data to provide a measurement signal for each of a plurality of longitudinal sensing portions of the optical fibre; analysing the measurement signals from said longitudinal sensing portions to identify signals corresponding to the same acoustic wave arriving at a first plurality of longitudinal sensing portions; and determining from the time of arrival of said acoustic wave at the longitudinal sensing portions of said first plurality the direction and/or distance of the origin of said acoustic wave from the optical fibre.

In yet another aspect of the invention there is provided a method of determining lateral offset of an acoustic event in distributed acoustic sensing comprising the steps of: taking data corresponding to detected electromagnetic radiation which has been back-scattered from a first length of optical fibre and detected electromagnetic radiation which has been back-scattered from a second length of optical fibre; processing said data to provide a measurement signal for each of a plurality of longitudinal sensing portions of each the first length of optical fibre and the second length of optical fibre; analysing the measurement signal from said longitudinal sensing portions to identify signals corresponding to the same acoustic wave arriving at one or more longitudinal sensing portions of the first length of optical fibre and one or more longitudinal sensing portions of the second length of optical fibre and determining from the time of arrival of said acoustic wave at said longitudinal sensing portions the direction and/or distance of the origin of said acoustic wave from the optical fibre.

The methods of these aspect of the present invention offers all of the advantages and can be used in all of the same embodiments as described above in relation to the other aspects of the invention.

The invention extends to methods, apparatus and/or use substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

DESCRIPTION OF THE DRAWINGS

Preferred features of the present invention will now be described, purely by way of example, with reference to the accompanying drawings, in which.

DESCRIPTION OF THE INVENTION

Figure 1:
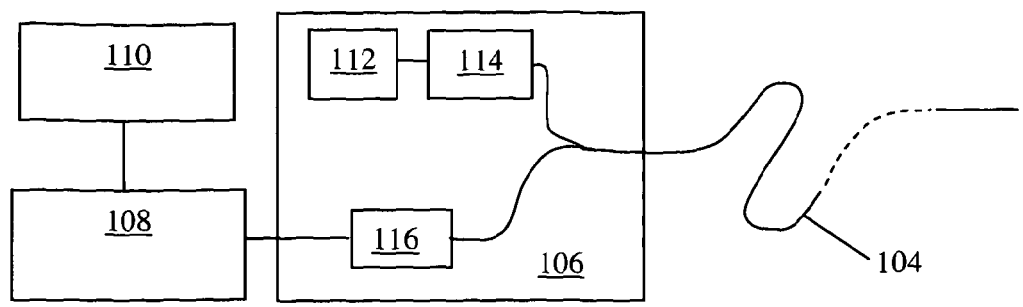
FIG. 1 illustrates the basic components of a distributed fibre optic sensor.

FIG. 1 shows a schematic of a distributed fibre optic sensing arrangement. A length of sensing fibre 104 is connected at one end to an interrogator 106. The output from interrogator 106 is passed to a signal processor 108, which may be co-located with the interrogator or may be remote therefrom, and optionally a user interface/graphical display 110, which in practice may be realised by an appropriately specified PC. The user interface may be co-located with the signal processor or may be remote therefrom.

The sensing fibre 104 can be many kilometres in length, and in this example is approximately 40 km long. The sensing fibre is a standard, unmodified single mode optic fibre such as is routinely used in telecommunications applications. In conventional applications of optical fibre distributed sensors the sensing fibre is at least partly contained within a medium which it is wished to monitor. For example, the fibre 104 may be buried in the ground to provide monitoring of a perimeter or monitoring of a buried asset such as a pipeline or the like.

The invention will be described in relation to a distributed acoustic sensor, although the skilled person will appreciate that the teaching may be generally applicable to any type of distributed fibre optic sensor.

In operation the interrogator 106 launches interrogating electromagnetic radiation, which may for example comprise a series of optical pulses having a selected frequency pattern, into the sensing fibre. The optical pulses may have a frequency pattern as described in GB patent publication GB2,442,745 the contents of which are hereby incorporated by reference thereto. As described in GB2,442,745 the phenomenon of Rayleigh backscattering results in some fraction of the light input into the fibre being reflected back to the interrogator, where it is detected to provide an output signal which is representative of acoustic disturbances in the vicinity of the fibre. The interrogator therefore conveniently comprises at least one laser 112 and at least one optical modulator 114 for producing a plurality of optical pulse separated by a known optical frequency difference. The interrogator also comprises at least one photodetector 116 arranged to detect radiation which is backscattered from the intrinsic scattering sites within the fibre 104.

The signal from the photodetector is processed by signal processor 108. The signal processor conveniently demodulates the returned signal based on the frequency difference between the optical pulses such as described in GB2,442,745. The signal processor may also apply a phase unwrap algorithm as described in GB2,442,745.

The form of the optical input and the method of detection allow a single continuous fibre to be spatially resolved into discrete longitudinal sensing portions. That is, the acoustic signal sensed at one sensing portion can be provided substantially independently of the sensed signal at an adjacent portion.

The sensor as described in GB2,442,745 however only gives information about the acoustic signal effecting the fibre at each sensing location. This sensor gives no information about the relative position of the source of the acoustic disturbance lateral to the fibre.

Figure 2:
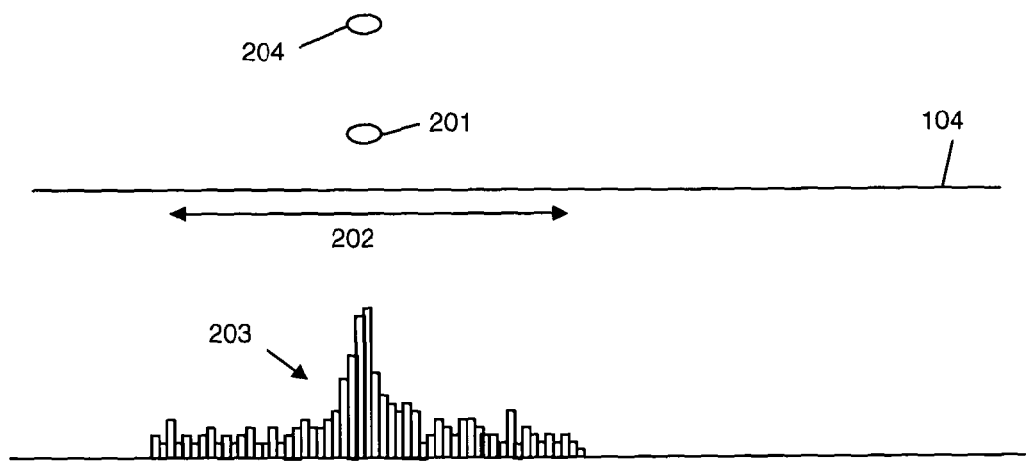
FIG. 2 illustrates a sensing fibre and illustrates the longitudinal sensing portions of the fibre.

FIG. 2 illustrates a length of optical fibre 104 which is used a sensing fibre in a distributed acoustic sensor. The fibre may be buried in the ground and may be arranged, for instance, along the length of a pipeline and arranged to monitor for interference with the pipeline. An event creating acoustic waves occurs at position 201. The acoustic waves propagate to the fibre 104 and cause a change in the back-scatter radiation detected. The sensor processes the signal returns from each of a plurality of sensing portions of the fibre to give a signal indicative of the acoustic intensity. Plot 203 shows an example histogram of the average acoustic intensity of each sensing channel in section 202 of the fibre over a short period of time. It can be seen that the acoustic disturbance causes a noticeable peak in acoustic intensity in the channels closest to the source of the acoustic event. This can be used to detect an acoustic occurrence and indicates where along the fibre the event has occurred. However this gives no information about the lateral offset of the source of the event from the fibre. An acoustic event occurring at position 204 could give rise to exactly the same acoustic intensity pattern. For a pipeline monitoring system say the lateral offset may be important. Digging within a certain distance of the pipeline may be a cause for concern and would generate an alarm. However digging which is relatively far from the pipeline would not be a cause for concern. In many other applications determining the lateral offset would also be advantageous.

Figure 3:
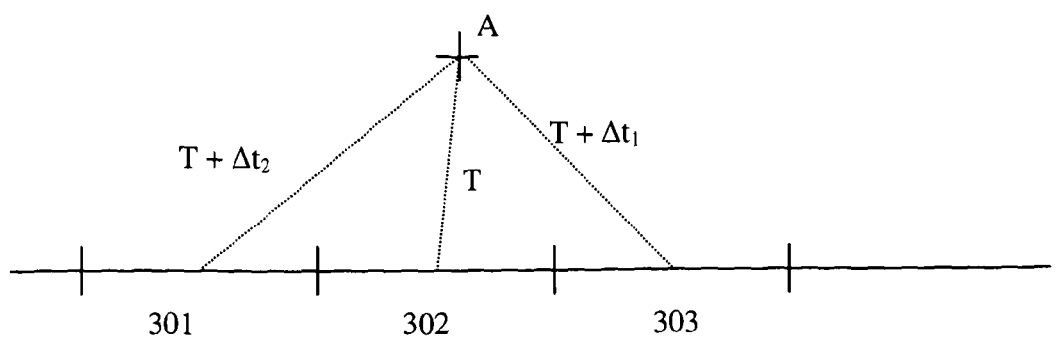
FIG. 3 illustrates the principles of time of arrival analysis.

Thus in one embodiment of the present invention the processor is arranged to determine the extent of the lateral offset based on the time of arrival of the acoustic signals at different sensing portions of the fibre. Referring to FIG. 3 a section of sensing fibre is illustrated with three discrete sensing portions 301, 302 & 303 shown. An acoustic event occurs at position A which generates an acoustic wave which propagates to the sensing fibre and is detected by the sensing portions of the fibre.

It will be clear that, assuming the propagation speed of the acoustic wave is the same in all directions, the wave will be incident on sensing portion 302 first, as this is closest to the source. It will next be incident on sensing portion 203 followed closely by portion 201.

It will be apparent that as the sensing portions have a finite length different parts of the sensing portion will be excited at different times. However, as each portion is the same length the returns from each sensing portion can be approximated to a single return at the centre of the sensing portion. The processor is therefore arranged to process the returns from adjacent sensors to detect signal returns from several adjacent sensing portions which appear to be due to the same acoustic stimulus, e.g. a significant change in one sensing portion followed within a short time by significant changes in each neighbouring sensing portion. The processor may therefore identify an acoustic response that is due to the same stimulus and thus may determine the time of arrival at three or more of the relevant sensing portions.

FIG. 3 illustrates the time of flight to the centre of each sensing portion. The time taken for the acoustic wave to propagate from the origin A to sensing portion 302 is T. The time to sensing portion 303 is slightly longer, $T+\Delta t_1$. The propagation time to sensing portion 301 is $T+\Delta t_2$. It will therefore be clear that based on the time of arrival the time of arrival at sensing portion 303 should be $\Delta t_1$ after the time of arrival at sensing portion 302. Similarly the time of arrival at sensing portion 301 is $\Delta t_2$ later than the time of arrival at sensing portion 302.

The processor may translate the different time of arrival in a distance based on the propagations speed of acoustic waves in the relevant medium, i.e. if the fibre is buried in the ground the speed of acoustic waves in ground is used. An average estimate may be used. As mentioned above this does rely on the assumption that the speed of propagation of acoustic waves is approximately the same in the material surrounding the fibre. On the length scales of a few tens of metres and to provide a general estimate of the location of the acoustic source this is a reasonable assumption.

In some instance, instead of using an average value, a value derived by test or calibration could be used. For instance once deployed the sensor may be calibrated by using a test acoustic source in a known location. This may allow any significant variations in acoustic propagation speed at different parts of the fibre to be identified and accounted for.

In any event the different times of arrival may be translated into a distance differential, i.e. a determination of how much further away the origin of the acoustic wave is from the centre of sensing portion 303 than 302.

The processor may then be arranged to determine the lateral offset of the origin of the acoustic source. In essence it will be appreciated that given the time of arrival at any two points, a curve (in 2D) or surface (in 3D) of position positions of the source can be plotted. To take a simplistic example, if the time of arrival at two sensing portions is exactly the same, the origin lies on a plane (or in two dimension a line) which bisect the lines joining the centre of the two portions. The time of arrival at two different sensing portions is thus insufficient to determine the actual offset—however with the time of arrival at at least three sensing portions the degree of lateral offset can be determined—for example a first curve/surface of possible locations could be plotted time using the different times of arrival at sensing portions 301 and 302 and another curve/surface plotted using the different times of arrival at portions 302 and 303. The points at which the two curves/surfaces meet determines the lateral offset although other and more efficient multilateration techniques may be used. More than three different arrival times may be used if available to potentially improve accuracy.

In the example shown in FIG. 3 however although the value of the lateral offset may thus be determined, i.e. how far away from the fibre the origin is, the arrangement shown in FIG. 3 will not resolve in which direction from the fibre the source of the acoustic disturbance is located. In purely two dimensions the source could be located on either side of the fibre. In some applications this may not be an issue. In the pipeline application the pipeline operator may not care on which side of the pipeline the acoustic source is located, only how far away the source is. In such an application it may be assumed that any type of potential interference is likely to be surface based or at least on a level with the pipeline, hence the problem may be constrained to two horizontal dimensions to reduce the complexity. In some instances the physical environment may be such that the acoustic source can only derive from one side anyway. However in may applications it is wished to determine the actual direction of the source of the acoustic waves, at least in two dimensions.

Figure 4:
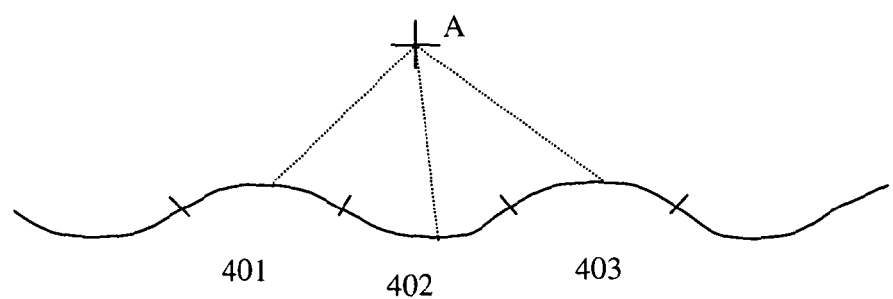
FIG. 4 shows a fibre geometry arranged to resolve lateral ambiguity.

In an alternative embodiment therefore the optical fibre has a geometry which is not generally rectilinear and is arranged such that at least some sensing portions of optical fibre are spaced apart from one another in a direction transverse to the fibre. FIG. 4 shows one example where the optical fibre has a meandering path such that adjacent sensing portions are offset from one another in a direction transverse to the fibre. Time of arrival analysis can be applied to adjacent sensing portions of the fibre 401, 402 & 403 in a same manner as described above—bearing in mind that the centre of the sensing portions are no longer co-linear. The lateral offset can be determined in effectively the same way but the offsetting of the sensing portions means that there is no lateral ambiguity in the result, at least in two dimensions. Again, depending on the application, all acoustic sources may be assumed to lie in the plane containing the fibre.

Figure 5A:
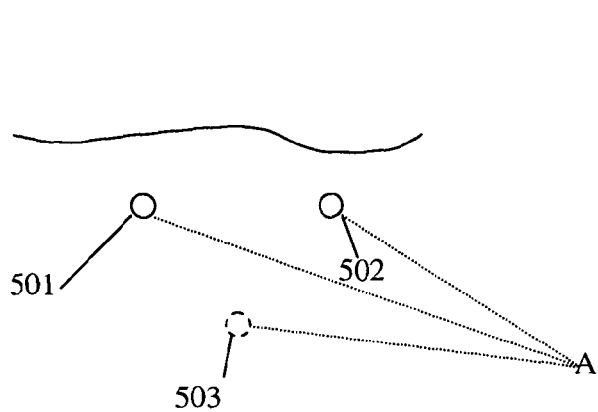
FIGS. 5a and 5b show sectional a plan views of an arrangement of multiple parallel sensing portions.
Figure 5B:
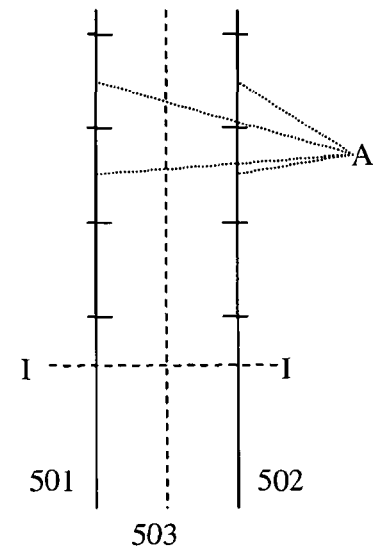

In an alternative embodiment the sensor may comprise multiple sensing portions of fibre. FIGS. 5a and 5b show a sectional and a plan view respectively of multiple buried optical fibres for a distributed acoustic sensor with FIG. 5a showing a section along the line I-I of FIG. 5b. A first fibre 501 is arranged to run alongside but separated horizontally from a second fibre 502. The two fibres may conveniently be substantially parallel and may be arranged such that the sensing portions of each fibre are of the same spatial length and substantially aligned. Such an arrangement may make the processing easier. However the two fibres may have different path variations and may have differently sized sensing portions, i.e. each may have a different spatial resolution, to provide additional functionality.

An acoustic event A will generate acoustic waves which will be incident on the fibres 501 and 502 and will be detected. As shown in FIG. 5a if the origin of the acoustic event is located to one side of the two fibres this will be easily determined by the time of arrival at the relevant fibres. In the example shown the sensing portions of fibre 502 will detect the acoustic signals before the sensing portions of fibre 501.

Obviously the processor will need to detect that the signals detected by fibre 502 are the same signals detected by fibre 501. This may of course be complicated by the fact that fibre 501 may be receiving a different acoustic impetus from the other side of the fibre pair. The processor may therefore analyse the acoustic signatures from the sensing portions of the two fibre to identify acoustic responses which correspond to the same event.

Time of arrival at the two different fibres can therefore be used to resolve any lateral ambiguity (in the horizontal) and time of arrival analysis as described above may be used to determine the amount of lateral offset.

The spacing of the two fibres may be dictated partly by the environment in which the fibre are deployed. However if the optical fibre 501 and 502 are too close together it may not be possible to distinctly identify the time of arrival at each fibre due to noise and/or measurement error. However if the fibre are too far apart it may be difficult to correlate the acoustic signals between the different fibres. A separation of the order of 0.5 m or more, say up to a few metres may be desirable for some applications.

The use of two, horizontally separated optical fibres therefore allows the lateral offset the source of the acoustic waves to be detected and the relative horizontal direction perpendicular to the fibres. As mentioned above this may be sufficient for many applications. In some applications however it may be wished to determine the location of the original of an acoustic wave in three dimensions. For example when used for seismic surveying or in down-well applications the fibres may be located running vertically and the location of an acoustic event may need to be determined in three dimensions, i.e. how far along the fibre and also the location of the origin in the two horizontal directions.

This could be achieved by adding an additional fibre which is not co-linear with the other two fibres. FIG. 5 illustrates that a third fibre 503 could be located spaced apart from fibre 501 and 502 in a direction perpendicular to the direction of spacing of fibre 501 and 502. This would allow the location of an acoustic event A to be determined in there dimension.

Figure 6:
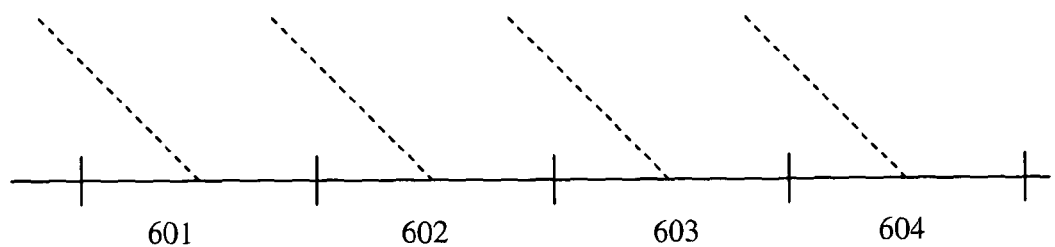
FIG. 6 shows the sensing portions of a fibre being used as beamforming array.

An alternative embodiment uses beamforming techniques to combine the measurement signals from a plurality of different sensing portions. Beamforming, as the skilled person will appreciate, combines the signals returns with different phases and weightings to provide directionality of the sensor, as illustrated in FIG. 6. In this way the returns from the sensing portions 601-604 to provide a certain desired directionality to the sensor. By comparing the signal returns from the sensing when combined in different directions the location of an acoustic source can be determined.

A yet further embodiment uses frequency analysis of the measurement returns from at least one sensing portion of fibre, preferably the sensing portion with the greatest magnitude measurement signal for a particular acoustic disturbance, to determine an indication of range.

In embodiment of the invention where the sensing fibre is embedded in a medium the propagation of an acoustic wave from the source to the fibre through the medium will attenuate the signal and the degree of attenuation will typically be frequency dependent. Thus acoustic signals propagating through the ground will be attenuated more strongly at high frequencies than at low frequencies. The measurement signals may therefore be divided into two or more distinct spectral bands and the relative energy of each band compared in order to give an indication of range to the source.

Figure 7:
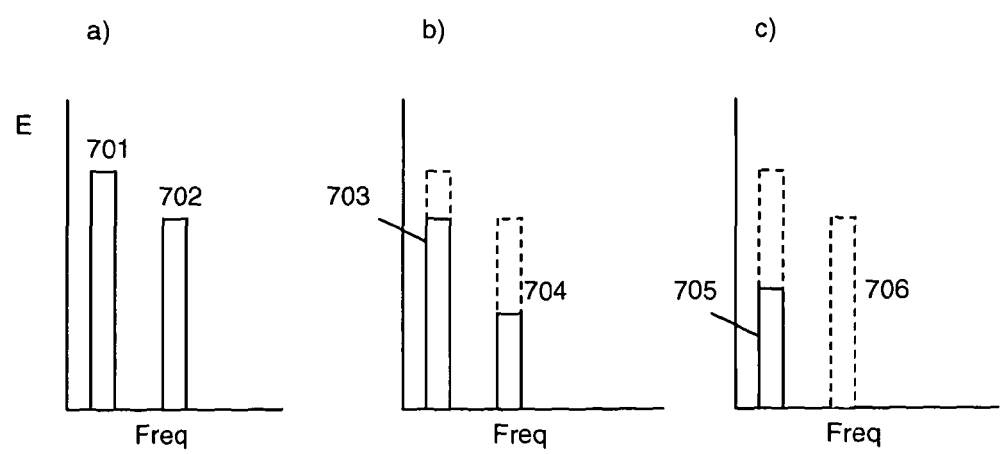
FIG. 7 illustrates the frequency attenuation of an acoustic signal propagating through the ground.

FIG. 7 illustrates how an analysis of just two frequency bands can be used to give an indication of range. FIG. 7 illustrates the relative energies of an acoustic signal in two frequency bands at three different distances of propagation through the ground, e.g. a) at source, b) at a first distance d and c) at a second distance of 2d.

At source (a) the energy of the two frequency bands is nearly the same although there is more energy in this instance in the low frequency band. The exact nature of the spectral characteristics of the original acoustic wave may, in some instances, be known for example when trying to detect particular types of event or if signature analysis determines the type of event. In other cases however the original spectral spread may not be known exactly but it may be reasonable to assume that there is at least of spread of energy in the acoustic frequencies.

After propagation (b) for a distance d there is attenuation of the acoustic signal in both frequency bands but there is a much greater degree of attenuation in the high frequency band. After further propagation (c) so that the signal has travelled a distance 2d the signal in the high frequency band may have been completely attenuated. There is still some low frequency signal however which can be detected.

Analysis of the frequency characteristics can therefore be used to give an indication of range. This indication could be relative, i.e. in comparing signals from a disturbance that are generated over time if the signal initially has a frequency spread that resembled graph (c) and then evolves to resemble graph (b) this can be taken as an indication that he source is getting closer.

The indication can also be quantitative however. For instance if the detected signal has a frequency profile which matches graph (b) the fact that there is still some energy in the relevant high frequency band may indicate an upper limit on the distance of the acoustic source from the sensing fibre. For typical acoustic sources, i.e. not large magnitude events such as earthquakes, there may be a distance limit beyond which no high frequency components would be expected. Thus detecting a high frequency component will mean that the acoustic source is closer than this range limit.

The actual value of the range limit will depend on the material that the fibre is embedded within and also the frequency of interest but the skilled person would readily be able to determine a series of threshold limits for particular frequencies in a particular medium.

It is also possible to detect a DC component in the measurement signals. Such a DC component is typically due to the action of a relatively close disturbance and thus a measurement of DC can also be used to determine an indication of range as discussed above.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfill the functions of several units recited in the claims. Any reference signs in the claims shall not be construed so as to limit their scope.

It will also be noted that each feature disclosed in the description, and (where appropriate) the claims and drawings may be provided independently or in any appropriate combination.

The invention claimed is:

1. A distributed acoustic sensor comprising:
   a first length of optical fibre, a source of electromagnetic radiation, a detector apparatus and a processor;
   a second length of optical fibre running alongside the first length of optical fibre but separated therefrom in a first direction;
   wherein the source of electromagnetic radiation is configured to launch electromagnetic radiation into said first length optical fibre and said second length of optical fibre;
   the detector apparatus is for detecting electromagnetic radiation back-scattered from said first length of optical fibre and said second length of optical fibre; and
   the processor is configured to:
      process data corresponding to the detected back-scattered radiation to determine a measurement signal for each a plurality of discrete longitudinal sensing portions of each the first length of optical fibre and the second length of optical fibre;
      analyse the measurement signal from said longitudinal sensing portions to identify signals corresponding to an acoustic wave arriving at one or more longitudinal sensing portions of the first length of optical fibre and at one or more longitudinal sensing portions of the second length of optical fibre; and
      determine from the time of arrival of said acoustic wave at said longitudinal sensing portions the direction and/or distance of the origin of said acoustic wave from the optical fibre.

2. A distributed acoustic sensor as claimed in claim 1 wherein the first and second lengths of optical fibre comprise separate optical fibres.

3. A distributed acoustic sensor as claimed in claim 1 wherein the first and second lengths of optical fibre comprise different parts of the same optical fibre.

4. A distributed acoustic sensor as claimed in claim 1 wherein the processor determines the direction of the acoustic wave in the first direction based on which length of optical fibre detects the wave first.

5. A distributed acoustic sensor as claimed in claim 1 wherein the processor is configured to use the time of arrival of the acoustic wave at a plurality of longitudinal sensing portions of the first and/or second lengths of optical fibre to determine the distance to the origin of the acoustic wave.

6. A distributed acoustic sensor as claimed in claim 1 wherein the processor uses the time of arrival and a value representing a propagation speed of an acoustic wave to determine a lateral offset.

7. A distributed acoustic sensor as claimed in claim 6 wherein the value representing the propagation speed of the acoustic wave is a value determined previously through test or calibration and stored by the processor.

8. A distributed acoustic sensor as claimed in claim 1 comprising a third length of optical fibre running alongside the first and second lengths of optical fibre and offset therefrom in a second direction, wherein the second direction is perpendicular to the first direction.

9. A distributed acoustic sensor as claimed in claim 8 wherein the processor is configured to use the returns from all three lengths of optical fibre to determine the location of the origin of the acoustic wave in three dimensions.

10. A distributed acoustic sensor as claimed in claim 1 wherein the processor is further configured to perform frequency analysis on the measurement signals to determine the distance of the origin of said acoustic wave.

11. A method of determining the origin of an acoustic wave in distributed acoustic sensing comprising the steps of:
   detecting with an electromagnetic radiation detector, electromagnetic radiation back-scattered from a first length of optical fibre and back-scattered from a second length of optical fibre running alongside the first length of optical fibre and separated therefrom in a first direction;
   directing data corresponding to the detected electromagnetic radiation which has been back-scattered from the first length of optical fibre and detected electromagnetic radiation which has been back-scattered from the second length of optical fibre to a processor;
   processing said data to provide a measurement signal for each of a plurality of longitudinal sensing portions of each the first length of optical fibre and the second length of optical fibre;
   analysing the measurement signal from said longitudinal sensing portions to identify signals corresponding to a same acoustic wave arriving at one or more longitudinal sensing portions of the first length of optical fibre and one or more longitudinal sensing portions of the second length of optical fibre and
   determining from the time of arrival of said acoustic wave at said longitudinal sensing portions the direction and/or distance of the origin of said acoustic wave from the optical fibre.

* * * * *